May 7, 1963 P. P. WUESTHOFF 3,088,613
POSITIONING MECHANISM FOR SPHERICAL BODIES
Filed April 15, 1960 3 Sheets-Sheet 1
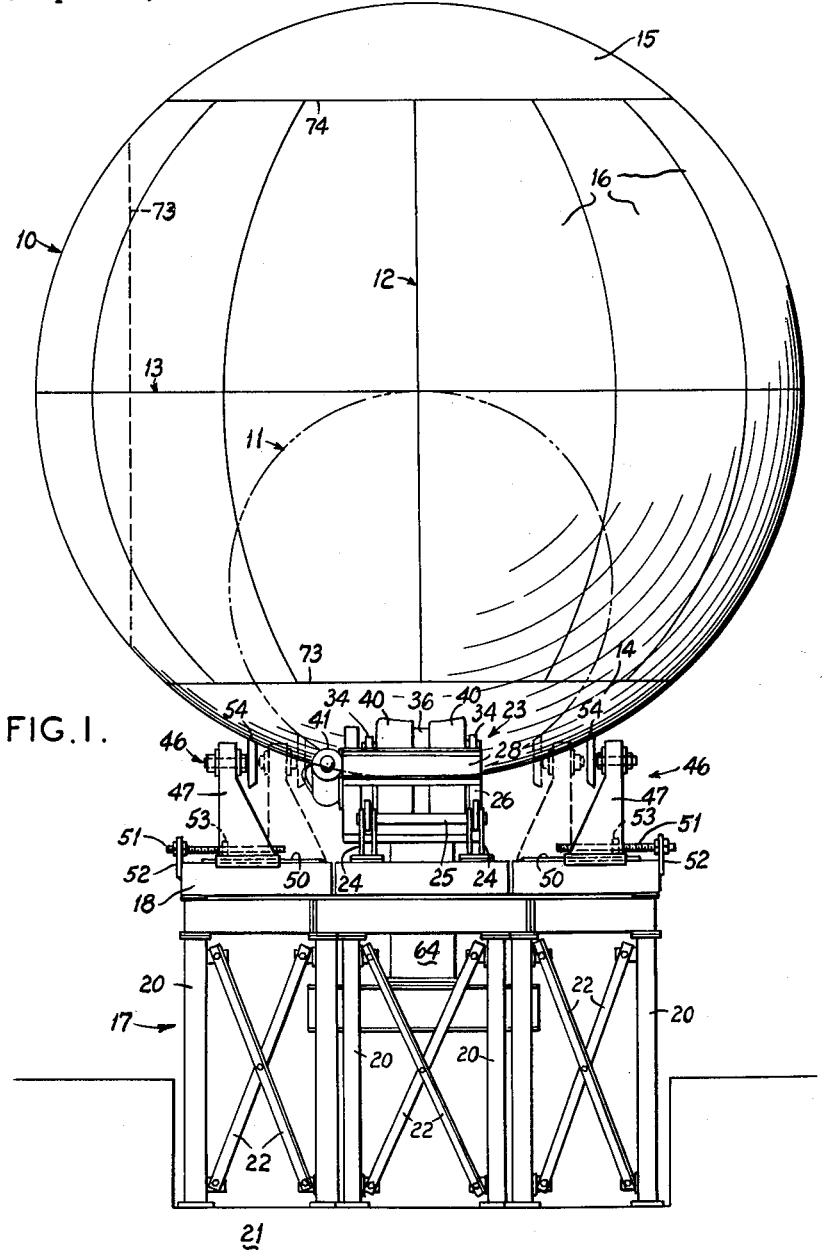
FIG.I.
INVENTOR
PAUL P. WUESTHOFF
BY Cohn and Powell
ATTORNEYS

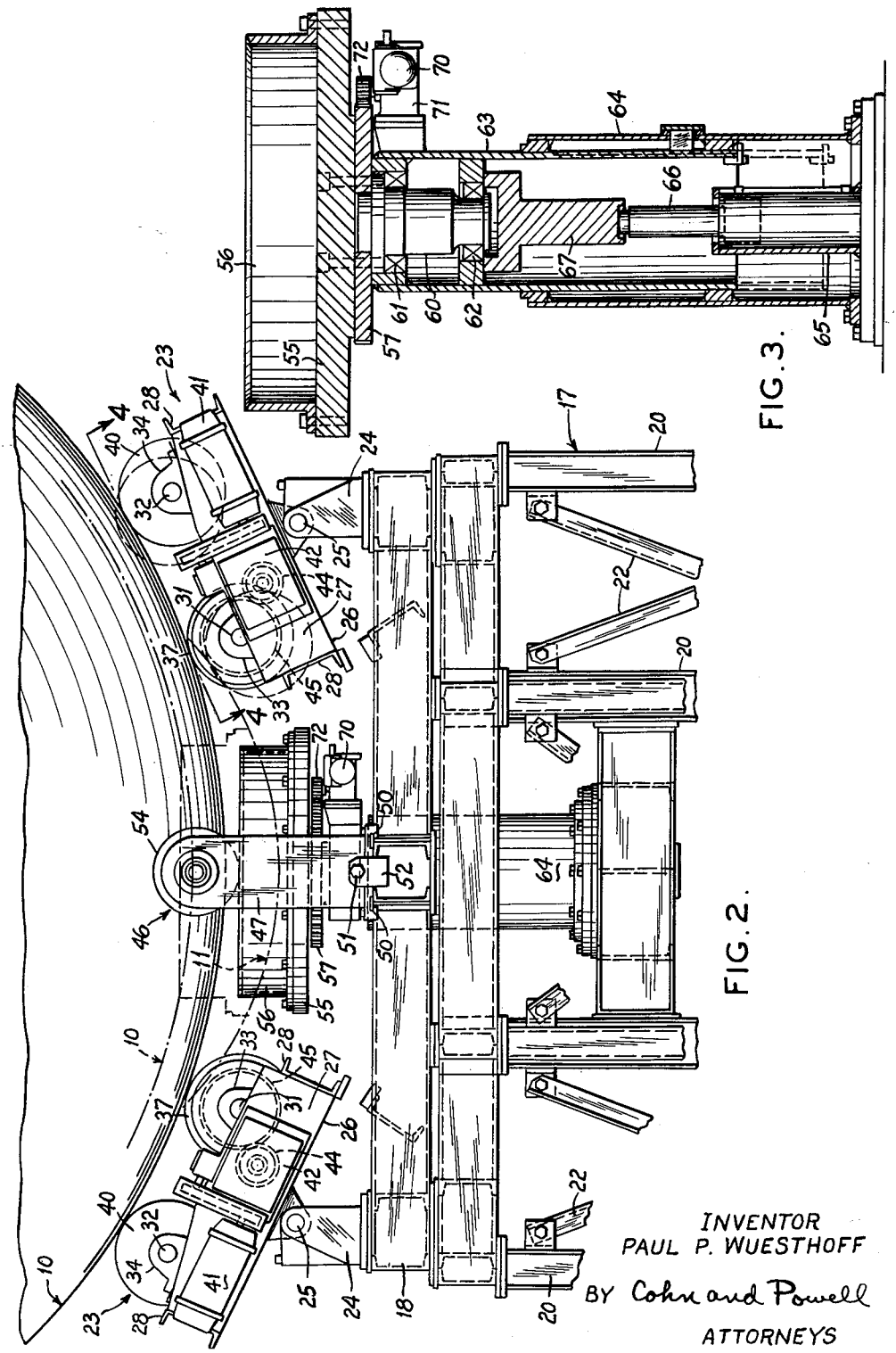

INVENTOR
PAUL P. WUESTHOFF

BY Cohn and Powell

ATTORNEYS

United States Patent Office
3,088,613
Patented May 7, 1963

3,088,613
POSITIONING MECHANISM FOR SPHERICAL BODIES
Paul P. Wuesthoff, St. Louis, Mo., assignor to Pandjiris Weldment Company, St. Louis, Mo., a corporation of Missouri
Filed Apr. 15, 1960, Ser. No. 22,470
3 Claims. (Cl. 214—340)

This invention relates generally to improvements in a positioning mechanism for spherical bodies, and more particularly to improved means for supporting and turning a sphere during welding incident to fabrication.

Hollow spherical bodies are utilized to store many different types of materials and elements. More specifically, large spheres are used to hold and store rocket propellant fuels under high pressure at firing sites prior to fueling and launching of missiles. In some instances the sphere is approximately twenty four (24) feet in diameter, weighs approximately 200,000 pounds, and is constructed of one and one-half inch thick stainless steel. The steel wall is constructed of plate segments that are individually formed in curved, orange-peel shapes, tack welded in place and then welded together to provide the finished item.

It is an important object of the present invention to provide a positioner that will support the sphere and rotate it at predetermined speeds so that any given point on the periphery will move in a flat vertical plane, thereby enabling the junctures of the plate segments to move selectively under a welding head upon rotation of the sphere in order to form a continuous weld.

An important object is achieved by the provision of yokes pivoted to opposite sides of a table on spaced horizontal axes and by wheels rotatively mounted and carried in such yokes, the wheels supporting the sphere along a center plane. Other important advantages are realized in that the axes of the wheels of each yoke are located on opposite sides of the yoke axis so that the yokes pivot or oscillate automatically to accommodate spheres of different diameters.

Another important object is afforded by the provision of a power means carried by each yoke and operatively connected to the wheels so that the wheels turn the sphere supported thereon about an axis parallel to the yoke axes, and in a manner so that any point on the sphere will move in a flat vertical plane at right angles to such rotative axis.

Still another important objective is achieved by providing stabilizers on the table adapted to engage opposite sides of the sphere to prevent the sphere from tipping off of the supporting wheels. By adjustably mounting the stabilizers on the table for selective movement toward and away from each other, the position of the stabilizers can be determined to engage and thus accommodate, spheres of various sizes.

Yet another important object is achieved by the provision of a platform immediately below the vertical center axis of the sphere and between the pivoted yokes, and by the provision of means for raising the platform to lift the sphere off of the wheels and support it in such elevated position. Power means operatively connected to the platform is provided to rotate such platform and hence rotate the sphere about its center vertical axis in order to present the junctures of the plate segments selectively in a welding zone under the welding head. After positioning of the sphere as explained, the platform can then be lowered to reseat the sphere on the wheels for subsequent turning for welding the selected plate juncture.

Another important objective is realized by the positioner having the pivoted yoke-and-wheel structure and the lifting platform in that by appropriately turning the sphere by the drive wheels about a horizontal axis and rotating the sphere by the platform about a vertical axis after being raised from the wheels, any flat plane passed through the sphere can be positioned so as to be rotated by the wheels in a vertical plane for welding operation.

Another important object is to provide a positioning mechanism for spherical bodies that is simple and durable in construction, economical to manufacture, efficient in operation, and which can be utilized to fabricate spheres of various diameters.

The foregoing and numerous other objects and advantages of the invention will more clearly appear from the following detailed description of a preferred embodiment, particularly when considered in connection with the accompanying drawings, in which:

FIG. 1 is a side elevational view of the positioning mechanism supporting a spherical body;

FIG. 2 is an enlarged, fragmentary side elevational view of the positioning mechanism as seen from the left of FIG. 1;

FIG. 3 is a cross-sectional view of the center lift platform and its hydraulic operating means.

Figure 4:
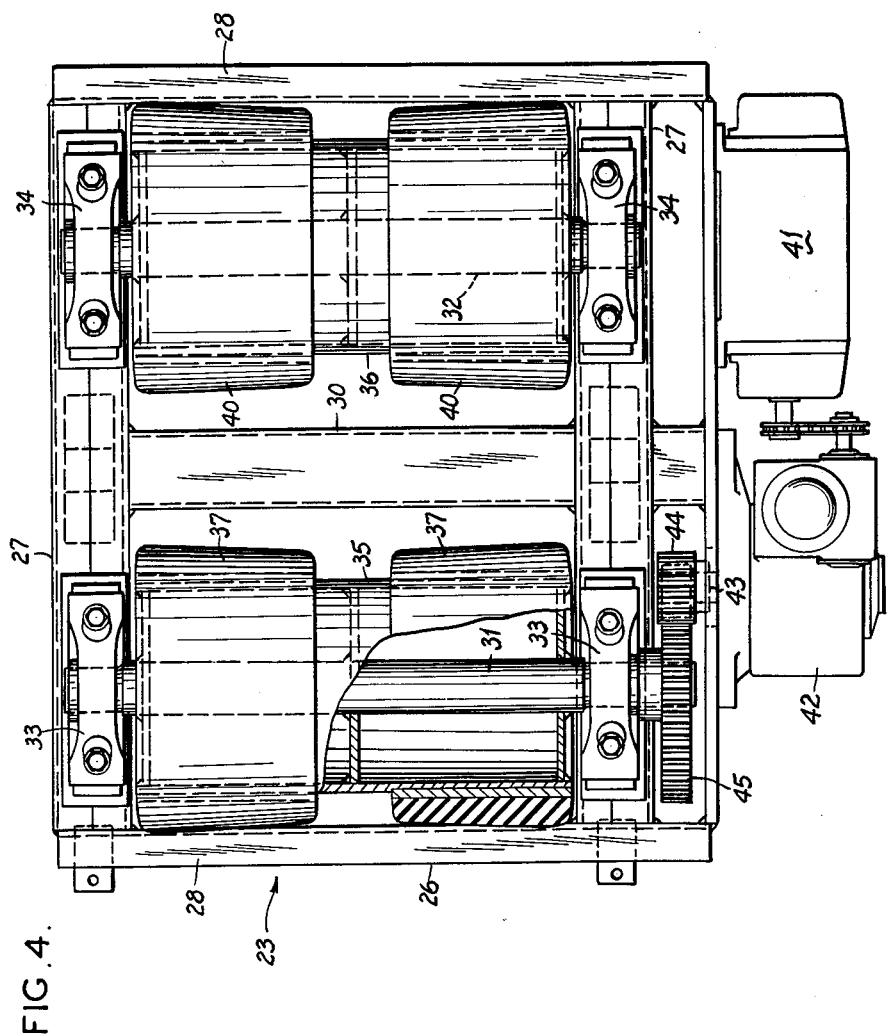
FIG. 4 is an enlarged top plan view of one of the sphere-supporting means as seen along line 4—4 of FIG. 2.

Referring now by characters of reference to the drawings, and first to FIG. 1, it is seen that the positioning mechanism is adapted to support and turn spherical bodies of different diameters. The sphere 10 represents the largest body for which the positioner is designed, while sphere 11 shown in broken lines represents a smaller body. As will be apparent from the later detailed description of parts and function, the spherical body 10 is supported along a center plane indicated at 12, and rotated about the horizontal center axis referred to at 13 and disposed at right angles to the center plane 12.

The spherical body 10 is usually constructed of an upwardly concave cup-like crown plate 14, an opposing downwardly concave cup-like crown plate 15 and interconnecting orange-peel plate segments 16 welded together along their junctures as is illustrated in FIG. 1.

The positioner includes a table indicated at 17, the top 18 of which is formed by interconnected channel members. A plurality of legs 20 depend from top 18 and serve to support the positioner on a subjacent surface such as a floor 21. The legs 20 are interconnected and reinforced by cross braces 22.

Means 23 (FIG. 2) is provided at opposite sides of the table 17 to support and rotate the sphere 10. More particularly, the sphere-supporting means 23 includes a pair of spaced brackets 24 at opposite sides of the table 17. Each pair of brackets 24 at one side of the table is interconnected by a pivot pin 25, as is perhaps best shown in FIG. 1. The brackets 24 form a rigid part of the table top 18.

Pivotally mounted on each pivot pin 25 and disposed between each associated pair of brackets 24 is a yoke 26. The pivot pins 25 provide spaced, parallel horizontal axes, and consequently the yokes 26 are aligned and pivotally moved in the same plane extending transversely of the table 17.

The construction of the sphere-supporting means 23 at each side of the table 17 is identical so that a detailed description of one will suffice for the other. The structure of this sphere-supporting means 23 is best shown in FIG. 4.

Each yoke 26 includes a pair of laterally spaced flanges 27 interconnected and secured by cross braces 28. A tubular sleeve 30 extends between the side flanges 27 and is adapted to receive the pivot pin 25 for rotatively mounting yoke 26.

Located on opposite sides of the pivot axis provided by pin 25 are a pair of shafts 31 and 32 arranged parallel to the pivot axis. Shaft 31 is rotatively mounted in pillow blocks 33 attached to the upper edge of said flanges 27. The other shaft 32 is similarly mounted by a pair of pillow blocks 34.

A cylindrical member 35 is secured to shaft 31 so as to be rotatable therewith, and hence is considered a part of such shaft 31. A similar cylindrical member 36 is attached to shaft 32 so as to be rotatable therewith. These cylindrical members 35 and 36 are closed at their opposite ends, and are located between the side flanges 27 of the yoke 26.

A pair of wheels 37 are attached to cylindrical member 35 of shaft 31 so as to be rotatable therewith. The wheels 37 are specifically rubber tires that are adapted to support the curved periphery of the sphere body 10. The wheels 37 are located substantially at the center plane 12 of the sphere body 10, yet are located at opposite sides. Because of this particular location, the outer rims of wheels 37 are slightly curved to conform with the curved configuration of the spherical body 10.

Another pair of wheels 40 are attached to the cylindrical member 36 of shaft 32 so as to be rotatable therewith. The wheels 40 are aligned with the cooperating pair of wheels 37 and are provided with slightly curved peripheries to conform with the spherical configuration of body 10 as described with respect to wheels 37.

Because the yokes 26 are pivoted on pins 25 and because the axes of shafts 31 and 32 in each yoke are located on opposite sides of its pivot axis, it is seen that the yokes 26 will pivot or oscillate automatically so that the wheels 37 and 40 support and engage spheres of different diameters. For example, if the larger spherical body 10 were removed and the smaller body 11 were centered on top of the positioner, the yokes 26 would oscillatively adjust about their pivot axes formed by pins 25 to accommodate the different curvilinear configuration of such smaller spherical body 11 so that the wheels 37 and 40 engage and support such body.

Attached to and carried by each yoke 26 is an electric motor 41 constituting a power means and a speed reducing unit 42 operatively connected to motor 41. The output shaft 43 of the speed reducing unit 42 is drivingly connected to a pinion 44 that meshes with a gear 45 secured to the outer end of wheel shaft 31. Thus it is seen that motor 41 operates to drive or rotate shaft 31 and hence rotate wheels 37. Only one pair of wheels 37 in each yoke 26 is powered and operates to turn the spherical body supported by the yokes 26 and by the wheels 37 and 40 mounted therein.

The electrical motors 41 are of the synchronous type and are electrically controlled so that the drive wheels 37 in each yoke 26 operate to turn the spherical body 10 at the same predetermined rate of speed.

A pair of stabilizers referred to at 46 (FIG. 1) is mounted to opposite sides of table 17 in alignment in a transverse plane at right angles to the center plane 12 supported by the sphere-supporting means 23. Each stabilizer 46 includes a post 47 slidably mounted on a guide plate 50 attached to the table top 18. A screw 51 is attached to an upstanding lug 52 on the table frame and is threadedly attached to a nut 53 fixed to post 47. Upon threaded adjustment of screw 51, the nut 53 travels longitudinally along such screw in a direction depending upon the direction of rotation.

Rotatively mounted on post 47 is a roller 54 that is adapted to engage the periphery of spherical body 10.

The stabilizers 46 do not function to support any substantial weight of the spherical body 10, but merely operate to engage the body to prevent such body from tipping sideways off of the supporting wheels 37 and 40 in the sphere-supporting means 23. The position of stabilizers 46 can be selectively adjusted upon manipulation of screws 51 so as to move such stabilizers toward or away from each other so that the rollers 54 just engage the spherical body 10. As is illustrated in broken lines in FIG. 1, the stabilizers 46 can be moved inwardly to accommodate the smaller spherical body 11.

Disposed immediately below the vertical center axis of the spherical body 10 and located between the pivoted yokes 26 and between the stabilizers 46, is a platform 55 constituting a part of a lift mechanism. The platform 55 is provided with pads or other means 56 adapted to receive and support the lower portion of the spherical body 10 when the platform 55 is raised as will be explained subsequently.

The detailed construction of the lift mechanism is perhaps best shown in FIG. 3. Attached to the lower side of platform 55 is a gear 57 that is rotatable therewith. The gear 57 is attached to a stub shaft 60 that is rotatively mounted in vertically spaced bearings 61 and 62 secured inside of cylindrical post 63.

Attached to the frame of table 17 is a column 64 that is adapted to receive slidably and telescopically the cylindrical post 63. Mounted within the column 64 is a hydraulic cylinder 65 in which a piston 66 is reciprocally mounted. The upper end of piston 66 engages and supports a center member 67 fixed to cylindrical post 63.

The hydraulic system for operating cylinder and piston 65 and 66 is not illustrated because it does not form a component part of this invention and because such a system is conventional. However, it will be readily understood that the piston 66 can be extended to lift the cylindrical post 63 and hence lift the platform 55, when desired. Conversely, the piston 66 can be retracted within cylinder 65 so that the platform 55 and the cylindrical post 66 is lowered under gravity.

Attached to and carried by the cylindrical post 63 is a motor 70 and a cooperating speed reducer unit 71. The output shaft of the speed reducing unit 71 is drivingly connected to a pinion 72 that meshes with the gear 57 to rotate platform 55 in either direction. With this lift mechanism, it is seen that when the spherical body 10 is lifted from the sphere-supporting means 23 upon raising platform 55, the sphere can be rotated about its vertical center axis by rotating platform 55 with motor 70 through its pinion gear drive connection 72 and 57.

It is thought that the operation and functional advantages of the positioner have become apparent from the foregoing detailed description of parts, but for completeness of disclosure, its use will be briefly described in fabricating a spherical body 10.

First, the lower upwardly concave crown plate 14 is placed on the sphere-supporting means 23. The yokes 26 will pivot so that the supporting wheels 37 and 40 engage and support its periphery at a vertical center plane. Then, the stabilizers 46 are adjusted in position until the rollers 54 engage the plate. As explained previously, the stabilizers 46 do not actually support the weight of the spherical body, but serve to prevent lateral tipping of the body from the supporting wheels 37 and 40 during fabrication.

The orange-peel segments 16 are located in place and tack welded together and to the upper and lower crowns 14 and 15. The junctures of the plate segments are now ready to be united by a continuous weld.

The platform 55 is raised to lift the spherical body 10 off of the supporting wheels 37 and 40, and the platform 55 is then rotated to turn the body 10 until a plate juncture is located in the vertical center plane 12 (FIG. 1). After locating this plate juncture, the platform 55 is then lowered so that the spherical body 10 is completely supported on the wheels 37 and 40 of the sphere-supporting means 23. Motors 41 are energized to drive wheels 37 in each of the yokes 26, and hence turn the spherical body 10 about its horizontal center axis 13. The plate juncture located in the center plane 12 moves continuously at a predetermined rate of speed under a welding head.

After completing the continuous weld between one set of adjacent plate segments 16, rotation of spherical body 10 is stopped by de-energizing motors 41. Then the procedure described above is repeated to place another juncture between plate segments 16 in the center plane 12. Briefly, the platform 55 is raised to lift the spherical body 10 from supporting wheels 37 and 40, and the body 10 is rotated by platform 55 to place the next juncture at the center plane 12. Then the platform 55 is lowered to seat the spherical body 10 again on the supporting wheels 37 and 40. Again, motors 41 are energized so that the drive wheels 37 rotate the spherical body 10 to move the plate segment juncture under the welding head to provide a continuous weld.

This described procedure is repeated until all of the plate segments 16 have been welded together.

Then, the positioner can be utilized to provide a continuous weld at the juncture of the plate segments 16 with each of the crown plates 14 and 15. First, the spherical body 10 is turned by drive wheels 37 until the juncture 73 is located in a vertical plane. Then, the platform 55 is raised to lift the spherical body 10 off of the supporting wheels 37 and 40, and the platform 55 is then rotated so as to turn the spherical body 10 about its vertical center axis until the juncture 73 is located in a vertical plane as is illustrated in broken lines in FIG. 1 parallel to the center plane 12 and at right angles to the rotative axis of wheels 37 and 40. The welding head is located in this same vertical plane with juncture 73.

Then, the spherical body 10 is lowered back on to the supporting wheels 37 and 40 by lowering platform 55. It is seen that upon energization of motors 41, the drive wheels 37 will turn the spherical body 10 so that the juncture 73 will move under the welding head to provide a continuous weld.

The juncture 74 between the top crown plate 15 and the plate segments 16 can be welded continuously in a similar manner.

It will be readily apparent that upon appropriately manipulating the lift mechanism in conjunction with rotation of the sphere-supporting means 23 that any plane passed through the spherical body 10 can be located and turned in a vertical plane passed at right angles to the rotative axis of wheels 37 and 40 as defined by shafts 31 and 32.

Adjustment of the positioner for different sizes of spherical bodies is quickly and easily accomplished. For example, assuming that a spherical body of the size indicated by reference character 11 is desired to be fabricated, the spherical body 11 is centered between the supporting wheels 37 and 40. Because the yokes 26 are pivoted, the yokes 26 will accordingly pivot sufficiently to enable the supporting wheels 37 and 40 to engage and support the periphery of such body 11. Then, the stabilizers 46 are moved inwardly upon adjustment of screws 51 until the rollers 54 engage the body surface, all as indicated in broken lines in FIG. 1.

Although the invention has been described by making detailed reference to a single preferred embodiment, such detail is to be understood in an instructive, rather than in any restrictive sense, many variants being possible within the scope of the claims hereunto appended.

I claim as my invention:

1. A positioning mechanism for spherical bodies comprising a table, a pair of yokes disposed in a relatively stationary position and in alignment on opposite sides of said table and pivoted to said table on parallel horizontal axes, a plurality of wheels rotatively mounted in each yoke on axes parallel to said yoke axis, one of said wheel axes in each yoke being located on each side of the yoke axis so that said wheels support spherical bodies of different sizes along a vertical center plane, stabilizing means adjustably mounted to the other opposite sides of said table and adapted to engage the body, said stabilizing means being selectively movable toward and away from each other to accommodate spherical bodies of different sizes, a platform between said yokes and below said body, means connected to said platform for vertically raising the platform to lift the body vertically from the wheels and for vertically lowering the platform to seat the body on said wheels, a gear attached to said platform, drive means operatively connected to said gear for rotating the platform after the platform is raised to change the center plane of the body supported on the wheels when the platform is subsequently lowered, and power means operatively connected to said wheels and adapted to turn the body about a horizontal axis fixed relative to said table and located at a right angle to said vertical center plane.

2. The combination and arrangement of elements as recited above in claim 1, but further characterized in that said stabilizing means comprises a pair of spaced brackets, means adjustably mounting said brackets to said table for movement toward and away from said body, and a roller rotatively attached to each bracket on an axis parallel to the yoke axes and adapted to engage and roll on the side of the spherical body thereby to steady the body on said wheels.

3. A positioning mechanism for spherical bodies comprising a table, a pair of yokes disposed in alignment on opposite sides of said table and pivoted to said table on parallel horizontal axes fixed in position relative to said table, a pair of shafts rotatively mounted in each yoke, said shafts in each yoke being disposed parallel to and on opposite sides of said yoke axis, a pair of wheels drivingly attached to each shaft to support a spherical body along a vertical center plane, said pairs of wheels being disposed on each side of said center plane, power means carried by each yoke and drivingly connected to at least one shaft in each yoke for rotating the body about a horizontal axis fixed relative to said table and located at a right angle to said vertical center plane, a pair of spaced brackets, means adjustably mounting said brackets to said table for movement toward and away from said body, a roller rotatively attached to each bracket on an axis parallel to the yoke axes and adapted to engage the body along a center plane located at a right angle to the center plane on which the wheels support the body, a platform between said yokes and below said body, lift means connected to said platform for vertically raising the platform to lift the body vertically from the wheels and for vertically lowering the platform to seat the body on said wheels, a gear attached to said platform, and drive means operatively connected to said gear for rotating the platform after the platform is raised to change the center plane of the body supported on the wheels when the platform is subsequently lowered.

References Cited in the file of this patent

UNITED STATES PATENTS

| | | |
|---|---|---|
| 1,870,760 | Tipton | Aug. 9, 1932 |
| 2,483,932 | Powell | Oct. 4, 1949 |
| 2,626,717 | Kraner | Jan. 27, 1953 |
| 2,667,978 | Pridy | Feb. 2, 1954 |
| 2,680,420 | Sheffer et al. | June 8, 1954 |
| 2,701,648 | McBath | Feb. 8, 1955 |
| 2,781,930 | Menser et al. | Feb. 19, 1957 |